United States Patent [19]

Ikenoue

[11] Patent Number: 5,187,514
[45] Date of Patent: Feb. 16, 1993

[54] PHOTOGRAPHIC FILM PACKAGE
[75] Inventor: Shinpei Ikenoue, Ashigara, Japan
[73] Assignee: Fuji Photo Film Co., Ltd., Kanagawa, Japan
[21] Appl. No.: 587,911
[22] Filed: Sep. 25, 1990
[30] Foreign Application Priority Data Sep. 25, 1989 [JP] Japan .................................. 1-248498

[51] Int. Cl.$^5$ .............................................. G03B 17/26
[52] U.S. Cl. .......................................... 354/275
[58] Field of Search ........................................ 354/275

[56] References Cited

U.S. PATENT DOCUMENTS

| | | | |
|---|---|---|---|
| 4,221,479 | 9/1980 | Harvey ................... | 354/275 |
| 4,834,306 | 5/1989 | Robertson et al. ....... | 354/275 X |
| 4,841,319 | 6/1989 | Hansen ................... | 354/275 |
| 4,848,693 | 7/1989 | Robertson ............... | 354/275 X |
| 4,866,469 | 9/1989 | Shiba et al. ............. | 354/202 |
| 5,009,372 | 4/1991 | Loewe .................... | 354/275 X |

FOREIGN PATENT DOCUMENTS 0279450  8/1988  European Pat. Off. .
0283242  9/1988  European Pat. Off. .
3907539  9/1989  Fed. Rep. of Germany .

OTHER PUBLICATIONS

European Search Report, dated Dec. 13, 1990, by Examiner S. Magrizos, No. EP 90118348.

*Primary Examiner*—Michael L. Gellner
*Assistant Examiner*—David M. Gray
*Attorney, Agent, or Firm*—Sughrue, Mion, Zinn, Macpeak & Seas

[57] ABSTRACT

A photographic film package having a film wound on a spool in a housing having an exit/entrance port, orients fixedly with a film cartridge chamber of a camera such that the film will exit the package in the winding direction of the camera and exhibit superior flatness at the exposure station of the camera. The film has light-sensitive layers having total layer thickness of not thicker than 30 μm on one side of a transparent support and a back layer containing a hydrophilic polymer having a layer thickness of from 15% to 90% of the total layer thickness of the light-sensitive layers on the other side of the support.

10 Claims, 3 Drawing Sheets

BL : BACK LAYER
BASE : FILM SUPPORT
AH : ANTIHALATION LAYER
IL : INTERLAYER
RL : RED-SENSITIVE LAYER
IL : INTERLAYER
GL : GREEN-SENSITIVE LAYER
YF : YELLOW FILTER LAYER
BLL : BLUE-SENSITIVE LAYER
PL : PROTECTIVE LAYER

PHOTOGRAPHIC FILM PACKAGE

FIELD OF THE INVENTION

This invention relates to a cartridge containing a silver halide photographic material (photographic film). More particularly, the invention relates to a cartridge containing a roll-form silver halide photographic material having a back layer and having a means for controlling the position in a camera, said cartridge being suitable for a pseudo zoom camera. In this invention, the cartridge containing a photographic film is also referred to as a "photographic film package" for distinguishing it from an empty cartridge.

BACKGROUND OF THE INVENTION

Recently, in corporation with the improvements of the graininess, the sharpness, and the color reproducibility of silver halide photographic materials such as mainly silver halide color negative photographic materials and with the popularization of a camera equipped with a zoom lens or a two focal points lens, high quality photographs enriched with variety have been obtained.

However, a camera equipped with a zoom lens or a two focal points lens, if the focal length at the telephoto side is lengthened, is quite large and consequently inconvenient to carry, while if the camera is small, it loses sufficient telephoto effect.

As a means for solving the aforesaid problems, a pseudo zoom technique has been recently proposed with the aid of the progress of the performance of color negative films as disclosed in U.S. Pat. Nos. 3,490,844, 4,583,831, and 4,650,304.

According to the pseudo zoom technique, information as to the focal distance of a lens inlet at the time of photographing is detected during the printing process to enlarge a part of the picture of the negative film, resulting in a telephoto effect for the developed print. The techniques of pseudo zoom hitherto proposed are for a color negative roll film of 135 format, which is a leading format at present.

However, it has been found that, when the aforesaid pseudo zoom technique is practiced using a color negative roll film of a 135 format, which is predominantly used at present, the image quality, particularly the sharpness of color images, is insufficient. Differing from a usual large-size print, the print obtained by the pseudo zoom technique corresponds to a small-size print cut from a part of a large-size print. The appreciation distance for a small-size print is shorter than that for a large-size print. Accordingly, in a small-size print formed by a pseudo zoom, the sharpness is very important.

The telephoto photographic print formed by a pseudo zoom corresponds to a print formed from a photographic film of a small format such as 110 format. However, in a 110 format, a cause of deteriorating the sharpness of the print is that the camera does not have a film pressure plate for securing the flatness of the film, and a shade paper at the back side of the film disturbs the flatness of the film.

However, it has also been found that the proposed pseudo zoom system does not have the aforesaid factors which deteriorate the sharpness of prints and, thus, the sharpness of the photographic film itself becomes very important for obtaining the print of sharp images in the pseudo zoom technique.

As a result of various investigations, the inventor has found that, when the humidity changes at photographing, film curls and thereby moves out of the focal plane of the camera and, in particular, in a print having a telephoto effect given by a pseudo zoom technique, the deterioration of the sharpness becomes severe. Furthermore, it has also been found that the use of a conventional cartridge (Patrone) for a 135 format which has been practically used with satisfactory results for the past several tens of years gives more serious reduction in the sharpness with changes in the humidity in the pseudo zoom technique.

The body portion of a cartridge for 135 format is cylindrical as shown in FIG. 1, the length of the outlet of film (port portion) of the cartridge is not constant, and the position of the cartridge in a camera is determined by the portion of a pile-like ribbon protruded from the port portion. Thus, when a cartridge is loaded in a camera, the position of the cartridge in the camera can not be controlled at a definite position.

Accordingly, in a combination of a 135 cartridge and a camera having a function of detecting the sensitivity of film by a general DX code, when the cartridge is loaded in the camera, it is impossible to keep the film outlet of the cartridge at the plane including the exposure stage of the camera, and, when the cartridge is once loaded in the camera, photographing is conducted in the non-plane state. If the film outlet of a cartridge is largely out of the plane of the exposure state of the camera, the extruded film near the film outlet is set in the camera in a bent state. It has been found that, when the bent film is sent to the exposure stage of the camera, the change of the curling state of the film in the exposure state is accelerated when humidity is changed to greatly deteriorate the flatness of the film. In particular, in a pseudo zoom print system, the enlarging magnification is increased and hence the inferiority of the flatness of film as described above becomes a serious defect. Therefore, it has been found that the establishment of the technique for stably keeping the flatness of film in the exposure stage of a camera is a new theme for improving the image quality of a print obtained by a pseudo zoom print system.

Furthermore, it has also been found that a serious problem caused by the increase of the enlarging magnification in a pseudo zoom print system is the scratches on the back surface of the film. As the result of various investigations, it has been confirmed that the scratches on the back surface of the film form white colorless portions on the print obtained therefrom, which are very conspicuous, and that more than 50% of the all of scratches of the film may form such white portions on the print. Accordingly, it has further been found that the prevention of the scratches on the back surface of a film is another new theme for improving the image quality of the print obtained by a pseudo zoom print system.

SUMMARY OF THE INVENTION

Thus, a first object of this invention is to provide a photographic film package including a cartridge containing a silver halide photographic material capable of producing prints having excellent sharpness.

A second object of this invention is to provide a photographic film package suitable for a pseudo zoom print system.

A third object of this invention is to provide a photographic film cartridge which is capable of controlling a photographic film so as not to bend between the film outlet of the cartridge and at the exposure stage.

A fourth object of this invention is to provide a photographic film package containing a silver halide color negative photographic material suitable for a pseudo zoom print system.

It has now been discovered that the aforesaid object can be attained by the present invention as set forth hereinbelow.

That is, according to this invention, there is provided a photographic film package comprising a spool having wound thereon a photographic film and a cartridge rotatably containing the spool carrying the photographic film, said cartridge having a film outlet for taking out and in the photographic film, wherein said cartridge has a means for controlling the position when the photographic film package is loaded in a camera such that the aforesaid film outlet is kept in the plane including the exposure state in the camera and the direction of taking out or in the photographic film in the camera becomes parallel to the winding direction of the photographic film in the camera, and the photographic film has light-sensitive layers having a total layer thickness of not thicker that 30 $\mu$m on one side of a transparent support and a back layer containing a hydrophilic polymer having a layer thickness of from 15% to 90% of the total layer thickness of the light-sensitive layers on the other side of the support.

That is, it has been found that by definitely controlling the position of the cartridge as described above when the photographic film package is loaded in a camera and by forming back layer as described above on the back side of the photographic film, the sharpness of pseudo zoom prints is particularly improved and the deterioration of the quality of prints caused by the formation of scratches on a film can be prevented.

DETAILED DESCRIPTION OF THE INVENTION

Figure 1:
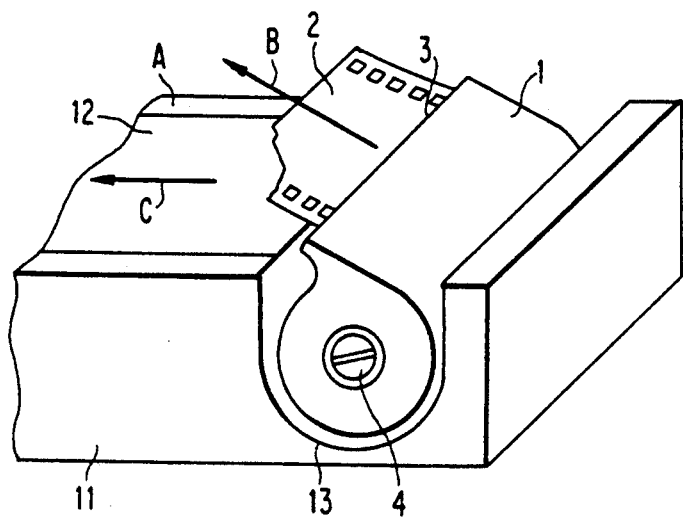
FIG. 1 is a schematic slant view showing a photographic film package having a 135 format cartridge and a part of a camera for explaining this invention.

As schematically shown in FIG. 1, the cartridge of the photographic film package of this invention has a means for controlling the position thereof when the photographic film package is loaded in a camera such that the film outlet 3 is kept in the plane (A) including at the exposure stage 12 of the camera, and the direction (B) at which the film enters and exits the cartridge becomes parallel to the winding direction (C) of the photographic film in the camera.

The fact that the film outlet 3 is kept in the plane (A) at the exposure stage 12 of the camera, means that the photographic film 2 will not become bent near the film outlet 3. Also, the film outlet 3 is not always in contact with the exposure stage 12 of the camera.

For controlling the position of the cartridge to maintain the aforesaid flatness of the film when the photographic film package is loaded in a camera, the cartridge may be set in a cartridge loading chamber 13 of a camera such that the cartridge can not rotate around the spool axis 4 in the chamber. Practically, a means of adapting the cartridge to the camera such that the cartridge keeps the aforesaid flatness may be equipped to the cartridge. Furthermore, for obtaining a more preferred adaptation of the cartridge and camera, it is preferred to improve the precision of the outer dimensions of the cartridge. In particular, it is preferred to improve the precision of the dimension of the length of the port portion.

A practical technique for controlling the position of a cartridge in a camera is to shape the cross-sectional plane of the cartridge (perpendicular to the spool), except for the film outlet portion, such that the body or the side edges or both are non-circular in shape. A non-circular shape will allow the cartridge to assure a fixed orientation in the cartridge chamber of a camera.

In an example that the side edge portion of the cartridge is a non-circle form, the sectional area of the side edge portion ($S_2$) is formed larger than the sectional area of the body portion ($S_1$), whereby the position of the cartridge in the camera can be controlled. In this case, however, too large of a sectional area ($S_2$) of the side edge portion is undesirable for reducing the body size of camera and, hence, it is desirable that the ratio of $S_2/S_1$ is generally less than 1.2, preferably less than 1.1, and particularly preferably less than 1.05.

Figure 5A:
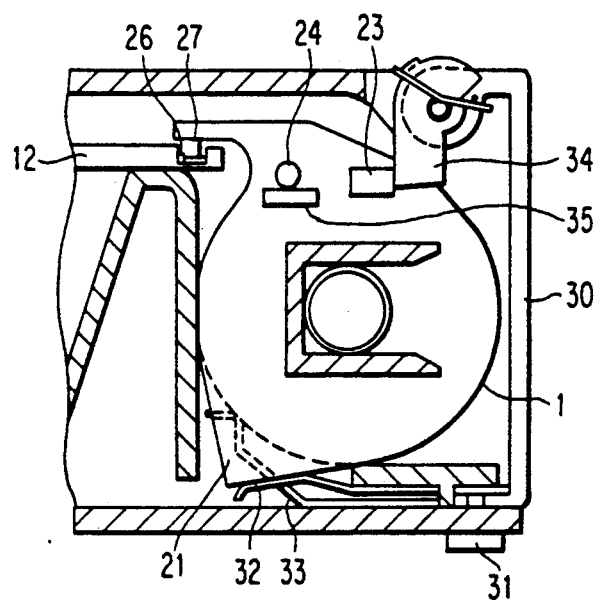
FIG. 5A and FIG. 5B are views showing the relation between the photographic film package and a camera.
Figure 5B:
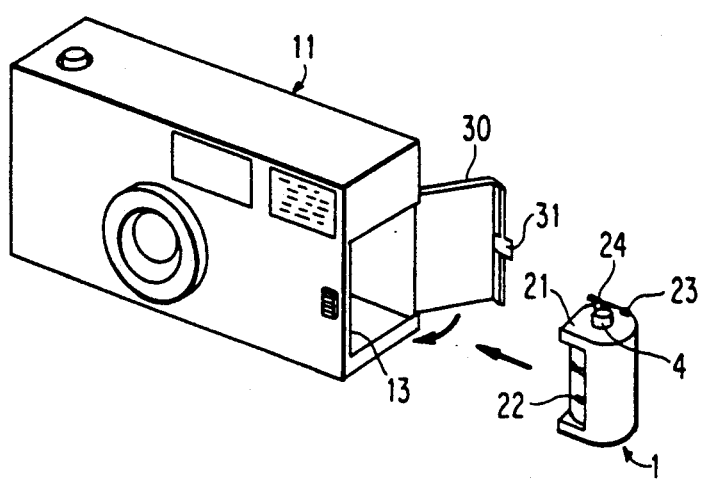

According to a practical example as shown in FIGS. 5A and 5B, a cartridge 1 is composed of side edge portions 21 for controlling the position of the cartridge, each having a non-circular form and a body portion 22 having a circular section. It is preferred that the aforesaid non-circular portions 21 and preferably the circular body portion 22 are adapted to a camera by means of springs 32 and 33 fixed in the cartridge loading chamber 13 of the camera such that the position of the cartridge is controlled.

Figure 2:
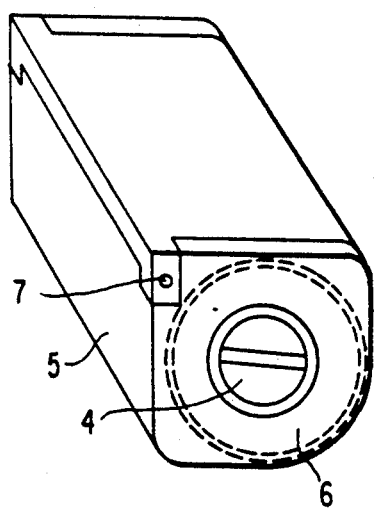
FIG. 2 to FIG. 4 are perspective views showing examples of the photographic film package of this invention.

As an example of the cartridge having a non-circular body portion (cross section), at least one side of the body of a cartridge is formed to a plane form as shown in FIG. 2. As the aforesaid plane form, the side face of the cartridge may have a flatness sufficient for controlling the position of the cartridge as in this invention and the side face may be curved to some extent. Also, it is preferred that such a plane face of the cartridge is substantially brought into contact with a specific face of the cartridge loading chamber in the camera. The term "substantially brought into contact" means a contact capable of sufficiently controlling the position of the cartridge as defined in this invention and does not always necessarily mean complete contact. In FIG. 2, 4 is the spool axis, 5 is a plane for controlling the position of the cartridge, 6 is a side edge portion of the cartridge, and 7 is a pin for fixing a cover of the cartridge.

One means for positioning the cartridge to the camera is to provide at least one joining means such as corresponding projections and cavities on the cartridge and the cartridge holder of the camera, respectively. Such projections and cavities constitute joining means for joining the cartridge to the cartridge holder.

Figure 3:
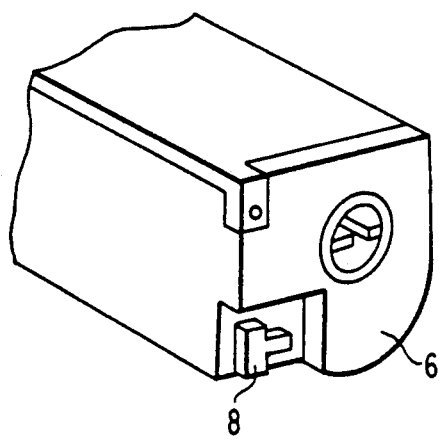

For example, as shown in FIG. 3, a T-shaped projection 8 for controlling the position of the cartridge is formed on the side edge portion 6 of the cartridge and the projection is adapted to fit in a T-shaped cavity formed in the cartridge loading chamber of the camera. It is preferred that such a projection is formed on both side edge faces of the cartridge.

Figure 4:
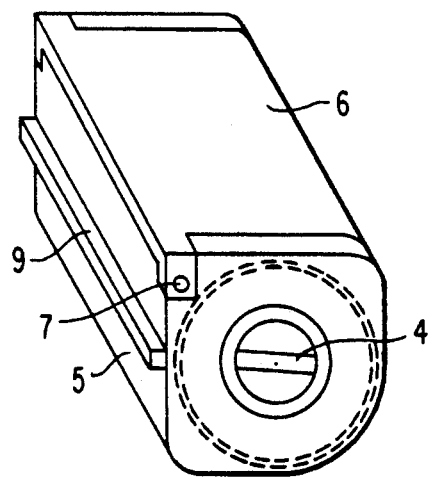

Or, as shown in FIG. 4, a straight line projection 9 for controlling the position of cartridge is formed on a side face 5 of the body of the cartridge and the projection 9 can be adapted to fit in a straight line cavity formed in the cartridge loading chamber of a camera. In FIG. 4, 4 is the spool axis and 7 is a pin for fixing a cover of the cartridge.

Also, as shown in FIG. 5A, a projection 27 for controlling the position of cartridge is formed at the film outlet of a cartridge and can be adapted to a cavity 26 for receiving the projection 27 formed at the exposure stage of a camera. Such a projection may be formed at any portion of the film outlet 3. For example, the projection 27 may be formed in a straight line form along the film outlet or one short projection may be formed at the center portion of the film outlet.

Alternatively, in the aforesaid cases, the projection may be formed in the camera and the corresponding cavity may be formed in the cartridge. Also, the projection and cavity may be of any suitable form and dimension as long as they achieve position control of the cartridge within the camera.

As still further joining means, there is a method wherein at least a pair of projections are formed in a camera and on the cartridge, respectively, and the cartridge is held in the cartridge loading chamber of the camera by the combination of these projections.

For example, as shown in FIG. 5A and FIG. 5B, a projection 23 on the cartridge 1 abuts a projection 34 in the camera and a projection 24 on the cartridge abuts a projection 35 in the camera, thereby holding the cartridge in position in the cartridge loading chamber 13 in the camera. Also, the holding means illustrated in FIG. 5A may exist at both the edge sides of the cartridge and of the cartridge loading chamber. In FIGS. 5A and 5B, 4 is the spool axis, 11 is a camera body, 12 is an exposure plate, and 30 is a cover of the cartridge loading chamber.

The aforesaid joining means for controlling the position of the cartridge in the cartridge loading chamber in the camera according to this invention may be one or a combination of two or more (FIG. 3, FIG. 4, and FIG. 5A).

Furthermore, for more effectively controlling the position of the cartridge in the camera, the dimensional precision of the external shape of the cartridge is preferably less than ±0.5 mm, and more preferably less than ±0.3 mm. Also, for far more effectively controlling the position of the cartridge in the camera, the dimensional precision of the length of the port portion of the cartridge is preferably less than ±0.3 mm, more preferably less than ±0.2 mm, and particularly preferably less than ±0.1 mm.

For securing the aforesaid precision, it is preferred to form the cartridge using a resin as the material.

Plastic materials for use in this invention can be produced by the methods, such as the addition polymerization of an olefin having a carbon-carbon double bond, the ring-opening polymerization of a small membered ring compound, the polycondensation of two or more kinds of polyfunctional compounds, the polyaddition of the aforesaid polyfunctional compounds, the addition condensation of a phenol derivative, a urea derivative, a melamine derivative, and a compound having aldehyde.

The aforesaid raw materials for the plastic materials are as follows.

Typical examples of the olefin having a carbon-carbon double bond are styrene, α-methylstyrene, butadiene, methyl methacrylate, butyl acrylate, acrylonitrile, vinyl chloride, vinylidene chloride, vinylpyridine, N-vinylcarbazole, N-vinylpyrrolidone, vinylidene cyanide, ethylene, and propylene. Also, typical examples of the small membered ring compound are ethylene oxide, propylene oxide, glycidol, 3,3-bischloromethyloxethane, 1,4-dioxane, tetrahydrofuran, troxane, ε-caprolactam, β-propiolactone, ethyleneimine, and tetramethylsiloxane.

Also, typical examples of the polyfunctional compound are carboxylic acids such as terephthalic acid, adipic acid, glutaric acid, etc.; isocyanates such as toluene diisocyanate, tetramethylene diisocyanate, hexamethylene diisocyanate, etc.; alcohols such as ethylene glycol, propylene glycol, glycerol, etc.; amines such as hexamethylenediamine, tetramethylenediamine, paraphenylenediamine, etc.; and epoxys.

Also, typical examples of the phenol derivatives, urea derivatives, and melamine derivatives are phenol, cresol, methoxyphenol, chlorophenol, urea, and melamine.

Furthermore, typical examples of the compound having aldehyde are formaldehyde, acetaldehyde, octanal, dodecanal, and benzaldehyde.

These raw materials may be used as one kind or two or more kinds according to the desired performance.

In the case of producing the plastic materials using these raw materials, a catalyst and/or a solvent is, as the case may be, used.

As the catalyst, there are radical polymerization catalysts such as (1-phenylethyl)azodiphenylmethane, dimethyl-2,2′-azobisisobutyrate, 2,2′-azobis-(2-methylpropane), benzoyl peroxide, cyclohexanone peroxide, potassium persulfate, etc.; cation polymerization catalysts such as sulfuric acid, toluenesulfonic acid, trifluorosulfuric acid, perchloric acid, trifluoroboron, tin tetrachloride, etc.; anion polymerization catalysts such as n-butyllithium, sodium/naphthalene, 9-fluorenyllithium, phenylmagnesium bromide, etc.; a triethylaluminum/tetrachlorotitanium series Ziegler-Natta catalyst, sodium hydroxide, potassium hydroxide, potassium metal, etc.

As the solvent, there is no particular restriction if the solvent does not hinder the polymerization, and examples thereof are hexane, decalin, benzene, toluene, cyclohexane, chloroform, acetone, methyl ethyl ketone, ethyl acetate, butyl acetate, and tetrahydrofuran.

As molding the plastic for producing the materials in this invention, if necessary, a plasticizer is mixed with the plastic. Typical examples of the plasticizer are trioctyl phosphate, tributyl phosphate, dibutyl phthalate, diethyl sebacate, methyl amyl ketone, nitrobenzene, γ-valerolactone, di-n-octyl succinate, bromonaphthalene, and butyl palmitate.

Then, specific examples of the plastic materials for use in this invention are illustrated below but the invention is not limited to them.

P-1: Polystyrene
P-2: Polyethylene
P-3: Polyporpylene
P-4: Polymonochlorotrifluoroethylene
P-5: Vinylidene chloride resin
P-6: Vinyl chloride resin
P-7: Vinyl chloride-vinyl acetate copolymer resin
P-8: Acrylonitrile-butadiene-styrene copolymer resin P-9: Methyl methacryl resin
P-10: Vinylformal resin
P-11: Vinylbutyral resin
P-12: Polyethylene phthalate
P-13: Teflon
P-14: Nylon
P-15: Phenol resin
P-16: Melamine resin The particularly preferred plastic materials in this invention are polystyrene, polyethylene, polypropylene, etc.

Usually, the cartridge is prepared using a plastic having kneaded therein carbon black or other pigment for imparting thereto a shading property.

For imparting a desired shading property to the cartridge, carbon black or other pigment is used in an amount of from 0.1 to 0.8% by weight, and preferably from 0.2 to 0.5% by weight based on the weight of the plastic material being used.

In this invention, the cartridges provided with the position determining function by improving the external forms of the cartridges described in Japanese Patent Application Nos. 63-57785 and 63-183344, U.S. Pat. Nos. 4,832,275, 4,846,418, 4,848,693, 4,834,306, 4,445,768, and 4,423,934 according to this invention.

Figure 6:
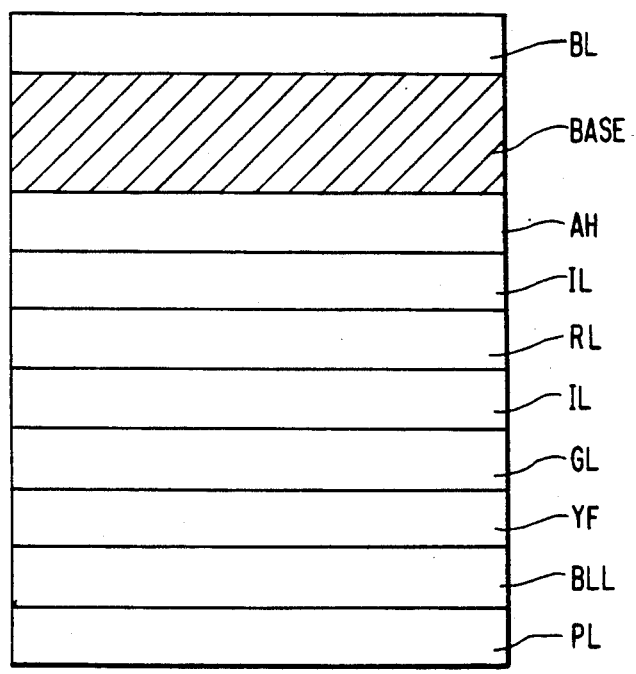
FIG. 6 is a schematic cross-sectional view of the layer arrangement of the multilayer silver halide color photographic film according to the present invention.

Then, the photographic film for use in this invention is explained in detail (see FIG. 6).

The total layer thickness of the light-sensitive layers of the photographic film in this invention is not thicker than 30 $\mu$m, preferably not thicker than 25 $\mu$m, and more preferably from 12 $\mu$m to 21 $\mu$m. The total layer thickness of the light-sensitive layers include the thicknesses of an antihalation layer near the support, the uppermost protective layer, and interlayers.

If the total layer thickness of the light-sensitive layers of the photographic film is too thick, the humidity reliance of the flatness of the photographic film at the exposure stage of the camera become undesirably strong.

Also, if the total layer thickness of the light-sensitive layers is too thin, the scratch resistance of the light-sensitive layers is undesirably deteriorated.

The total layer thickness of the light-sensitive layers can be easily measured by the microscopic photograph of the cross section of the photographic film or by using a layer thickness meter.

The thickness of the back layer of the photographic film in this invention is from 15% to 90%, preferably from 20% to 70%, and more preferably from 25% to 60% of the total layer thickness of the light-sensitive layers.

For keeping an adequate curling state of the photographic film at the exposure stage in a camera in a wide humidity range, it is necessary to keep the thickness of the back layer far thinner than the thickness of the light-sensitive layers. If the back layer is much thicker than the light-sensitive layers, at a low humidity, the film rises from the pressure plate to protrude to the lens side, thereby the focus becomes inferior.

Examples of the hydrophilic polymer which is used for the back layer of the photographic film in this invention are illustrated below but the invention is not limited to them.

That is, they are proteins such as gelatin, colloidal albumin, casein, etc.; cellulose derivatives such as carboxymethyl cellulose, hydroxyethyl cellulose, etc.; saccharose derivatives such as agar agar, sodium alginate, starch derivatives, dextran. etc.; and synthetic hydrophilic polymers such as polyvinyl alcohol, poly-N-vinylpyrrolidone, polyacrylic acid copolymers, polyacrylamide, polyacrylamide derivatives, partially hydrolyzed products of polyacrylamide, and gelatin derivatives. In these polymers, gelatin is particularly preferred.

As gelatin for use in this invention, there are so-called limed gelatin which is immersed in an alkali bath before the extraction of gelatin during the production step thereof, acid-treated gelatin which is immersed in an acid bath, double immersion gelatin which is obtained through the aforesaid two processes, and enzyme-treated gelatin.

The effect of the back layer of the photographic film becomes remarkable when the thickness of the transparent support (base) is thin. In order to reduce the size of the cartridge and reduce the thickness of the camera, it is important to reduce the thickness of the base. The thickness of the base for the photographic film in this invention is from 20 $\mu$m to 150 $\mu$m, preferably from 50 $\mu$m to 100 $\mu$m, and more preferably from 60 $\mu$m to 90 $\mu$m.

The back layer is composed of one or more layers. For increasing the adhesion between the back layer and the support, it is preferred that at least one layer thereof contains a high-boiling organic solvent.

In this case, any high-boiling organic solvents well known in the field of art can be used.

Examples of the solvent are phthalic acid alkyl esters such as dibutyl phthalate, dioctyl phthalate, dicyclohexyl phthalate, etc.; phosphoric acid esters such as diphenyl phosphate, triphenyl phosphate, tricresyl phosphate, dioctylbutyl phosphate, trioctyl phosphate, trihexyl phosphate, tricyclohexyl phosphate, etc.; citric acid esters such as tributyl acetylcitrate, etc.; benzoic acid esters such as octyl benzoate, etc.; alkylamides such as diethyllaurylamide, etc.; fatty acid esters such as dibutoxyethyl succinate, dioctyl azerate, etc.; and trimesic acid esters such as tributyl trimesate, etc, The amount of the high-boiling organic solvent for use in this invention is from 0.01 to 0.40 g, and preferbly from 0.05 to 0.30 g per square meter.

If necessary, the back layer(s) in this invention can further contain a surface active agent, an antistatic agent, a hardening agent, a lubricant, a matting agent, a dye, etc.

The back layer is composed of two or more layers. In this case, it is effective for improving the adhesion with the support to incorporate a high-boiling organic solvent in the layer near the support. In the layer, the ratio of the high-boiling organic solvent to gelatin is preferbly from 0.1 to 0.7 by weight ratio. Also, the incorporation of a matting agent, a lubricant, etc., in the layer of the back layers apart from the support is effective for the sticking prevention between the back layer and the surface layer of the photographic film and for imparting a slidability to the back layer.

For imparting a scratch resistance, it is effective to lower the oil/gelatin ratio in the layer apart from the support than that of the layer near the support.

There is no particular restriction on the antistatic agent which is used for the back layer in this invention. Examples thereof are anionic high molecular electrolytes such as polymers having a carboxylic acid, a carboxylate, or a sulfonate as described in JP-B-46-24159 (the term "JP-B" as used herein means an "examined published Japanese patent publication"), JP-A-48-22017, JP-A-51-30725, JP-A-51-129216, and JP-A-55-95942 (the term "JP-A" as used herein means an "unexamined published Japanese patent application"); cationic polymers as described in JP-A-49-121523, JP-A-48-91165, and JP-B-49-24582.

Also, as the surface active agent for use in this invention, there are anionic and cationic surface active agents as described in JP-A-49-85826, JP-A-49-33630, U.S. Pat. Nos. 2,992,108 and 3,206,312, JP-A-48-87826, JP-B-49-11567, JP-B-49-11568, and JP-A-55-70837.

Furthermore, the fluorine-containing compound or the compound having a quaternary nitrogen described in JP-A-62-215949 can be used together.

Moreover, the preferred antistatic agent for the back layer in this invention is fine particles of at least one kind of crystalline metal oxide selected from ZnO, $TiO_3$, $SnO_2$, $Al_2O_3$, $In_2O_3$, $SiO_2$, MgO, BaO, and $MoO_3$ or the composite oxides thereof.

The volume resistivity of the fine particles of the conductive crystalline metal oxide or the composite oxides thereof which are used as an antistatic agent for the back layer in this invention is less than $1 \times 10^7 \Omega$ cm, and preferably less than $1 \times 10^5 \Omega$ cm. Also, the particle size thereof is preferably from 0.01 to 0.7 μm, and particularly preferably from 0.02 to 0.5 μm.

The production method of the fine particles of the conductive crystalline metal oxide or the composite oxides thereof for use in this invention is described in detail in JP-A-56-143430 and JP-A-60-258541.

For example, there are a method for preparing fine particles of a metal oxide by burning and heat-treating the fine particles in the existence of a foreign atom for improving the electric conductivity, a method for producing fine particles of a metal oxide by burning in the existence of a foreign atom of improving the electric conductivity, and a method for producing fine particles of a metal oxide by burning while lowering the concentration of oxygen in the atmosphere to introduce the oxygen defect therein.

Examples of the foreign atom are Al, In, etc., for ZnO; Nb, Ta, etc., for $TiO_2$; and Sb, Nb, halogen, etc., for $SnO_2$. The addition amount of the foreign atom is in the range of preferably from 0.01 to 30 mol %, and particularly preferably from 0.1 to 10 mol %.

Since in a pseudo zoom print, the effective negative area is small and the magnification at printing is high, the deterioration of the quality of print by dust attached to the negative becomes larger than an ordinary print. It is preferred that static charging of a negative after processing is sufficiently restrained since the attachment of dust onto the negative is reduced. Accordingly, it is preferred that the back layer in this invention contains an antistatic agent which will not flow out therefrom in a processing solution.

A polymerized antistatic agent, a water sparingly soluble inorganic compound, etc., are effective for the aforesaid purpose.

Also, it is preferable to incorporate fine particles of an inorganic compound such as silicon dioxide, magnesium oxide, titanium dioxide, calcium oxide, etc., or fine particles of an organic compound such as polymethyl methacrylate, cellulose acetate propionate, a fluorine resin, etc., in the back layer in this invention for preventing sticking of the light-sensitive layer and the back layer when the photographic film is stored in a roll state. The preferred size of the aforesaid matting agent is from 1 μm to 10 μm. It is particularly effective for inhibiting the deterioration of the sharpness of pseudo zoom prints that the amount of the matting agent in the back layer is larger than that of the matting agent in the light-sensitive layer. Thus, the ratio of the amount of the matting agent in the back layer to that in the light-sensitive layer is preferably higher than 1.2/1, and more preferably higher than 2/1.

Now, examples of the useful flexible support for the photographic film in this invention are the films of cellulose esters (in particular, cellulose triacetate, cellulose diacetate, cellulose propionate, cellulose acetate propionate, cellulose butyrate, and cellulose acetate butyrate), polyamides (described in U.S. Pat. Nos. 2,856,385 and 2,848,439, and British Patent 542,509), polycarbonates (described in Belgian Patents 593,040, to 593,047, British Patent 853,587, U.S. Pat. No. 3,023,101, West German Patents 1,060,710 and 1,062,544, and French Patent 1,259,156), polyesters (described in JP-B-48-40414, British Patent 789,317, and Japanese Patent Application No. 63-71308) (in particular, polyethylene terephthalate, poly-1,4-cyclohexanedimethylene terephthalate, polyethylene 1,2-diphenoxyethane-4,4'-dicarboxylate, polybutylene terephthalate, polyethylene naphthalate, a copolymer polyester containing an aromatic dicarboxylic acid having a metal sulfonate as the copolymer component, and a copolymer polyester containing an aromatic dicarboxylic acid having a metal sulfonate and an aliphatic dicarboxylic acid as the copolymer components), polystyrene (described in British Patent 991,702), polypropylene (described in British Patent 964,780 and 921,635), polyethylene (described in French Patent 1,264,407), polymethylpentene, polysulfone, polyethersulfone, polyacrylate, aromatic polyetherimides, aromatic polyamides, aromatic polyamideimides, polyphenylene oxide (described in British Patent 1,250,206), and polyphenylene sulfide.

For these supports, a plasticizer may be, as the case may be, added for imparting flexibility. In particular, the support usually contains a plasticizer such as triphenyl phosphate, biphenyl phosphate, dimethyl phosphate, etc.

The thickness of the support for use in this invention is preferably thinner than 100 μm, more preferably from 50 m to 90 μm, and particularly preferably from 60 μm to 80 μm.

In the preferred mechanical strength of the support, the breaking strength is higher than 4 kg m², the initial elasticity is higher than 150 kg/m², and the bending elasticity is 150 kg/m².

The molecular weight of the support polymer for use in this invention is more than 10,000 and is usually from 20,000 to 800,000.

In the case of using the aforesaid polymer as the support, it is very difficult to strongly adhere a photographic layer composed of a protective colloid such as gelatin (e.g., a light-sensitive silver halide emulsion layer, an interlayer, a filter layer, etc.) onto the support since the support has a hydrophobic surface. For solving the problem, the following techniques have hitherto been practiced.

(1) A method of applying a surface activation treatment such as a chemical treatment, a mechanical treatment, a corona discharging treatment, a flame treatment, an ultraviolet treatment, a high frequency wave treatment, a glow discharging treatment, an active plasma treatment, a laster treatment, a mixed acid treatment, an ozone oxidation treatment, etc., to the support and then directly coating thereon a photographic emulsion to obtain a high adhesion.

(2) A method of forming a subbing layer on the support after applying the aforesaid surface activation treatment to the surface or without applying the surface treatment and coating a photographic emulsion on the subbing layer (as described in U.S. Pat. Nos. 2,693,241, 2,764,520, 2,864,755, 3,462,335, 3,475,193, 3,143,421, 3,501,301, 3,460,944, and 3,674,531, British Patents 788,365, 804,005, and 891,469, JP-B-48-431 and JP-B-51-446).

These surface treatments are cosidered to be by forming polar groups on the surface of the support, which was originally hydrophobic, or increasing the crosslinking density of the surface and, as the result thereof, it is considered the affinity of the surface with polar groups in the components contained in a coating composition for the subbing layer is increased or the fastness of the adhesion surface is increased. Also, as the subbing layer, various structures have been proposed. For example, there are a so-called double layer method wherein a layer having high adhesion to the support is formed thereon as a 1st layer (hereinafter is referred to a 1st subbing layer) and a hydrophilic resin layer having a high adhesion with a photographic emulsion layer is coated as a 2nd layer (hereinafter, is referred to as a 2nd subbing layer) and a single layer method wherein a resin layer having both a hydrophobic group and a hydrophilic group is coated as a single layer on the support.

In the surface treatments (1) described above, a corona discharging treatment is most popular and can be practiced by the method disclosed in JP-B-48-5043, JP-B-47-51905, JP-A-47-28067, JP-A-49-83767, JP-A-51-41770, and JP-A-51-131576. In this treatment, the discharging frequency is usually from 50 Hz to 5,000 KHz, and preferably from 5 KHz to several hundreds KHz. If the discharging frequency is too low, stable discharging is not obtained and pin holes are liable to form on the support treated. Also, if the discharging frequency is too high, a specific apparatus is required for impedance matching, which results in undesirably increasing the equipment cost.

The treating strength for the support being treated is from 0.001 KVA min./m$^2$ to 5 KVA min./m$^2$, and preferably from 0.01 KVA/m$^2$ to 1 KVA/m$^2$ for improving the wetting property of a plastic film such as a polyester film, a polyolefin film, etc. The clearance of the gap between the electrode and a dielectric roll is from 0.5 mm to 2.5 mm, and preferably from 1.0 mm to 2.0 mm.

In many cases, a glow discharging treatment can be used and is described in JP-B-35-7578, JP-B-36-10336, JP-B-45-22004, JP-B-45-22005, JP-B-45-24040, and JP-B-43480, U.S. Pat. Nos. 3,057,792, 3,057,795, 3,179,482, 3,288,638, 3,309,299, 3,424,735, 3,462,335, 3,475,307, and 3,761,299, British Patent 997,093, and JP-A-53-129262.

In the glow discharging condition, the pressure is generally from 0.005 to 20 Torr, and preferably from 0.02 to 2 Torr. If the pressure is too low, the surface treatment effect is reduced and, if the pressure is too high, an excessive electric current is passed to cause spark, which is dangerous and may damage the material to be treated. Glow discharging occurs by applying a high voltage between at least a pair of metal plates or metal rods disposed with a definite space in vacuum tank. The voltage differs according to the composition of the atmospheric gases and pressure but in the aforesaid ordinary pressure range, stationary glow discharging occurs in the range of from 500 volts to 5,000 volts. The particularly suitable voltage range for improving the adhesion is from 2,000 volts to 4,000 volts.

Also, the discharging frequency is from a direct to several thousands MHz, and preferably from 50 Hz to 20 KHz as in conventional techniques.

The discharging treatment strength for obtaining a desired adhesive performance is from 0.01 KVA min/m$^2$ to 5 KVA min./m$^2$, and preferably from 0.15 KVA min./m$^2$ to 1 KVA min./m$^2$.

Then, the subbing method (2) described above is explained.

These subbing methods are investigated well.

For the 1st subbing layer in the double layer method described above, copolymers formed using monomers selected from vinyl chloride, vinyldene chloride, butadiene, methacrylic acid, acrylic acid, itaconic acid, maleic anhydriude, etc., as the starting materials as well as other various polymers such as polyethyleneimine, epoxy resins, glafted gelatin, nitrocellulose, etc., have been investigated on the properties and for the 2nd subbing layer, gelatin has been investigated on the properties.

In the single layer method, good adhesion is attained in many cases by utilizing interfacial mixing of the support and a subbing polymer and the method is used well for cellulose derivative supports.

For a cellulose derivative, the effect of the surface treatment is less and hence a method of coating a gelatin coating composition formed by dispersing gelatin in mixed organic solvent of methylene chloride, ketone, and alcohol as a single layer to form a subbing layer using interfacial mixing utilizing swelling of the support and diffusion of gelatin is most generally used.

As a gelatin hardening agent, there are chromium salts (such as chromium alum, etc.), aldehydes (such as formaldehyde, glutar and aldehyde, etc.), isocyanates, active halogen compounds (such as 2,4-dichloro-6-hydroxy-s-triazine, etc.), epichlorohydrin resins, etc.

If necessary, these coating compositions for the subbing layers can contain various kinds of additives. Examples thereof are surface active agents, antistatic agents antihalation agents, coloring dyes, pigments, coating aids, antifoggants, etc. Also, in the case of using a subbing liquid in this invention, the subbing liquid may further contain an etching agent such as resorcinol, chloral hydrate, chlorophenol, etc.

Furthermore, the subbing layer in this invention can contain fine particles of an inorganic oxide such as SiO$_2$, TiO$_2$, etc., or fine particles (1 to 10 μm in size) of a polymethyl methacrylate copolymer as a matting agent.

COATING METHOD

The coating composition for the subbing layer in this invention can be coated by a coating method well known in the field of art, such as a dip coating method, an air knife coating method, a curtain coating method, a roller coating method, a wire bar coating method, a gravuré coating method, or an extrusion coating method using a hopper described in U.S. Pat. No. 2,681,294. If necessary, two or more layers can be simultaneously coated by the methods described in U.S. Pat. Nos. 2,761,791, 3,508,947, 2,941,898, and 3,526,528, and Yuji Harasaki, Coating Kogaku (Coating Engineering), page 253, published by Asakura Shoten, 1973.

The photographic film in this invention may have at least one silver halide emulsion layer such as a blue-sensitive emulsion layer, a green-sensitive emulsion layer, and a red-sensitive emulsion layer, and there is particular restriction on the number of silver halide emulsion layers and insensitive layers as well as on the disposition order of the layers.

A typical example of the photographic film in this invention is a silver halide photographic material having at least one light-sensitive layer composed of plural silver halide emulsion layers having substantially the same color sensitivity but each having a different light sensitivity on a support. The aforesaid light-sensitive layer is a unit light-sensitive layer having a color sensitivity to blue, green or red.

In a multilayer silver halide color photographic material, the three unit light-sensitive layers are generally disposed on a support in the order of a red-sensitive emulsion layer, a green-sensitive emulsion layer, and a blue-sensitive emulsion layer from the support side. However, according to the purpose, the aforesaid disposition order may be contrary thereto or the disposition order may be that a light-sensitive layer having a different color sensitivity is inserted between two light-sensitive layers having the same color sensitivity.

Also, insensitive layers such as interlayer, etc., may be formed between the silver halide emulsion layers, or as uppermost layer and the lowermost layer.

The interlayer(s) may contain a coupler, a DIR compound, etc., as described in JP-A-61-43748, JP-A-59-113438, JP-A-59-113440, JP-A-61-20037, and JP-A-61-20038, and also may contain a color mixing inhibitor as usually used.

As plural silver halide emulsion layers constituting each unit light-sensitive layer, a two-layer structure of a high-sensitive emulsion layer and a low-sensitive emulsion layer as described in West German Patent 1,121,470 or British Patent 923,045 can be preferably used. Usually, it is preferred that the aforesaid emulsion layers are disposed such that the sensitivity becomes successively lower towards the support and also an insensitive layer may be formed between the silver halide emulsion layers. Also, a high-sensitive emulsion layer may be formed to the side nearer to the support and a low-sensitive emulsion layer may be formed at the side far from the support as described in JP-A-57-112751, JP-A-62-200350, JP-A-62-206541, and JP-A-62-206543.

In practical examples, these layers are disposed from the farthest side from the support as a low-sensitive blue-sensitive layer (BL)/high-sensitive blue-sensitive layer (BH)/high-sensitive green-sensitive layer (GH)/low-sensitive green-sensitive layer (GL)/high-sensitive red-sensitive layer (RH)/low-sensitive red-sensitive layer (RL); or the order of BH/BL/GL/GH/RH/RL, or the order of BH/BL/GH/GL/RL/RH.

Also, as described in JP-B-55-34932, the layers of a blue-sensitive layer/GH/RH/GL/RL can be disposed on a support in this order. Furthermore, as described in JP-A-56-25738 and JP-A-62-63936, the layers of a blue-sensitive layer/GL/RL/GH/RH can be formed on a support in this invention.

Also, as described in JP-B-49-15495, a three layer constitution composed of the highest light-sensitive silver halide emulsion layer as an upper layer, an intermediate light-sensitive emulsion layer having a lower light sensitivity than the upper layer, and a lower light-sensitive emulsion layer having a lower light-sensitivity than the intermediate layer may be employed and in this case, the light-sensitivity becomes successively lower towards the support. In the case of employing 3 emulsion layers having different light sensitivities, as described in JP-A-59-202464, the layer order in a same color-sensitive layer may be intermediate-sensitive emulsion layer/high-sensitive emulsion layer/low-sensitive emulsion layer from the support side.

As described above, various layer structures and layer dispositions can be employed according to the purpose of the photographic film.

The preferred silver halide contained in the photographic emulsion layers of the photographic film in this invention is silver iodobromide, silver iodochloride, or silver iodochlorobromide each containing less than about 30 mol % silver iodide. A particularly preferred silver halide is silver iodobromide or silver iodochloride containing from about 2 mol % to about 25 mol % silver iodide.

The silver halide grains in the photographic emulsions for use in this invention may have a regular crystal form such as cubic, octahedral, or tetradecahedral, an irregular crystal form such as spherical or tabular, a crystal form having a crystal defect such as twin planes, or composite form thereof.

The grain sizes of the silver halide grains may be fine grains of less than about 0.2 microns or large grains having diameter of the projected area up to about 10 microns. The silver halide emulsion may be a polydisperse emulsion or a monodisperse emulsion.

The silver halide photographic emulsions for use in this invention can be prepared by the methods described in *Research Disclosure (RD)*, No. 17643, (December, 1978), pages 22 to 23, "I, Emulsion preparation and types", ibid., No. 18716, page 648 (November, 1979), P. Glafkides, *Chemic et Phisique Photographique*, Paul Montel, 1967, G. F. Duffin, *Photographic Emulsion Chemistry*, focal Press, 1966, and U. L. Zelikman et al, *Making and Coating Photographic Emulsion*, Focal Press, 1964.

The monodisperse silver halide emulsions described in U.S. Pat. Nos. 3,574,628 and 3,655,394 and British Patent 1,413,748 can be also preferably used in this invention.

Also, tabular silver halide grains having an aspect ratio of at least about 5 can be used in this invention. Tabular grain silver halide emulsions can be prepared by the methods described in Gutoff, *Photographic Science and Engineering*, Vol. 14, 248 to 257 (1970), U.S. Pat. Nos. 4,434,226, 4,414,310, 4,433,048, and 4,439,520 and British Patent 2,112,157.

The crystal structure may be uniform throughout the whole crystal in halogen composition or may have a different halogen composition between the inside and the surface portion. Also, the silver halide crystal may have a layer structure, or may have a silver halide having a different halogen composition joined by an epitaxial junction, or may be joined to other compounds such as silver rhodanide, lead oxide, etc.

Also, a mixture of silver halide grains having various crystal forms may be used.

The silver halide emulsion is usually subjected to physical ripening, chemical ripening, and spectral sensitization before use. Additives being used in such steps are described in RD, No. 17643 and RD, No. 18716 and they are shown in the following table together with other photographic additives being used in this invention.

| Additive | RD 17643 | RD 18716 |
|---|---|---|
| 1. Chemical Sensitizer | page 23 | page 648, right |

| Additive | RD 17643 | RD 18716 |
|---|---|---|
| 2. Sensitivity Increasing Agent | | column page 648, right column |
| 3. Spectral Sensitizer | pages 23-24 | page 648, right column |
| Super Dye Sensitizer | | page 649, right column |
| 4. Whitening Agent | page 24 | |
| 5. Antifoggant and Stabilizer | pages 24-26 | page 649, right column |
| 6. Light Absorbent, Filter Dye, and Ultraviolet Absorbent | pages 25-26 | page 649, right column to page 650, left column |
| 7. Stain Inhibitor | page 25, right column | page 650, left to right column |
| 8. Dye Image Stabilizer | page 25 | |
| 9. Hardening Agent | page 26 | page 651, left column |
| 10. Binder | page 26 | page 651, left column |
| 11. Plasticizer, Lubricant | page 27 | page 650, right column |
| 12. Coating Aid, Surface Active Agent | pages 26-27 | page 650, right column |
| 13. Antistatic Agent | page 27 | page 650, right column |

Also, for inhibiting the deterioration of the photographic performance by a formaldehyde gas, it is preferable to incorporate a compound capable of reacting with a formaldehyde gas to fix the gas described in U.S. Pat. Nos. 4,411,987 and 4,435,503 in the photographic light-sensitive material.

For the photographic film in this invention, various color couplers can be used and practical examples thereof are described in the patents described in RD, No. 17643, VII-C to G.

Yellow couplers which are preferably used in this invention are described in U.S. Pat. Nos. 3,933,501, 4,022,620, 4,326,024, 4,401,752, and 4,248,961, JP-B-58-10739, British Patents 1,425,020 and 1,476,760, U.S. Pat. Nos. 3,973,968, 4,314,023, and 4,511,649, and European Patent 249473A.

As magenta couplers, 5-pyrazolone series couplers and pyrazoloazole series couplers are preferred and particularly preferred examples of these magenta couplers are described in U.S. Pat. Nos. 4,310,619 and 4,351,897, European Patent 73636, U.S. Pat. Nos. 3,061,432 and 3,725,064, RD, No. 24220 June, 1984), JP-A-60-33552, RD, No. 24230 (June, 1984), JP-A-60-43659, JP-A-61-72238, JP-A-60-35730, JP-A-55-118034, and JP-A-60-185951, U.S. Pat. Nos. 4,500,630, 4,540,654, and 4,556,630, WO(PCT) 88/04795.

As cyan couplers, there are phenoic couplers and naphtholic couplers and examples thereof are described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, West German Patent (OLS) 3,329,729, European Patents 121365A and 249453A, U.S. Pat. Nos. 3,446,622, 4,333,999, 4,753,871, 4,451,559, 4,427,767, 4,690,889, 4,254,212, and 4,296,199, JP-A-61-42658.

For correcting the unnecessary absorption of colored dyes, the use of colored couplers described in RD, No. 17643, VII-G, U.S. Pat. No. 4,163,670, JP-B-57-39413, U.S. Pat. Nos. 4,004,929, 4,138,258, and British Patent 1,146,368 is preferred.

As a coupler forming a colored dye having proper diffusibility, the couplers described in U.S. Pat. No. 4,366,237, British Patent 2,125,570, European Patent 96570, and West German Patent (OLS) 3,234,533 are preferably used in this invention.

Typical examples of the polymerized dye-forming couplers are described in U.S. Pat. Nos. 3,451,820, 4,080,211, 4,367,282, 4,409,320, 4,576,910, and British Patent 2,102,173.

As couplers imagewise releasing a nucleating agent or a development accelerator at development, the couplers described in British Patents 2,097,140 and 2,131,188, JP-A-59-157638 and JP-A-59-170840 are preferred.

Examples of other couplers which can be used for the photographic films in this invention are competing couplers described in U.S. Pat. No. 4,130,427, poly-equivalent couplers described in U.S. Pat. Nos. 4,283,472, 4,338,393, and 4,310,618, DIR redox compound-releasing couplers, DIR coupler-releasing couplers, DIR coupler-releasing redox compounds, and DIR redox-releasing redox compounds described in JP-A-60-185950 and JP-A-62-24252, couplers releasing a dye recoloring after being released described in European Patent 173302A, bleach accelerator-releasing couplers described in RD, No. 11449, ibid., No. 24241, and JP-A-61-201247, ligand-releasing couplers described in U.S. Pat. No. 4,553,477, and couplers releasing a leuco dye described in JP-A-63-75747.

The aforesaid couplers for use in this invention can be introduced into the photographic films by various known dispersion methods.

In one of these methods, a oil drop-in-water dispersion method can be used and examples of a high-boiling solvent which is used for the oil drop-in-water dispersion method are described in U.S. Pat. No. 2,322,027.

Then, the invention is further explained by the following examples.

EXAMPLE 1

(1) Preparation of Color Negative Film

A back layer having the following composition was coated on one side of a cellulose triacetate film support having a thickness of 90 $\mu$m having subbing layers on both sides thereof, and the light-sensitive layers having the following compositions were formed on other side of the support to provide a color negative film A.

Back Layer Composition

The numeral corresponding to each component is the coating amount shown by a $g/m^2$ unit.

| Layer 16 (1st back layer) | |
|---|---|
| Gelatin | 4.20 |
| Ex-14 | 2.40 |
| Layer 17 (2nd back layer) | |
| Gelatin | 0.80 |
| Layer 18 (3rd back layer) | |
| Gelatin | 1.79 |
| Polymethyl acrylate particles (dimater: about 1.5 $\mu$m) | 0.30 |

Each layer further contained a gelatin hardening agent and a surface active agent. (Layer thickness 8 $\mu$m).

Light-Sensitive Layer Compositions

The numeral for each component is the coating amount shown by a $g/m^2$ unit, wherein, however, the numeral for colloid silver or a silver halide is the coating amount of silver calculated. However, the amount of a sensitizing dye is shown by mol unit per mol of silver halide in the same layer.

| Layer 1 Antihalation layer | |
|---|---|
| Black colloid silver | 0.18 as silver |
| Gelatin | 1.40 |
| Layer 2 Interlayer | |
| 2,5-Di-t-pentadecylhydroquinone | 0.18 |
| EX-1 | 0.07 |
| EX-3 | 0.02 |
| EX-12 | 0.002 |
| U-1 | 0.06 |
| U-2 | 0.08 |
| U-3 | 0.10 |
| HBS-1 | 0.10 |
| HBS-2 | 0.02 |
| Gelatin | 1.04 |
| Layer 3 1st Red-sensitive emulsion layer | |
| Emulsion A | 0.25 as Ag |
| Emulsion B | 0.25 as Ag |
| Sensitizing dye I | $6.9 \times 10^{-5}$ |
| Sensitizing dye II | $1.8 \times 10^{-5}$ |
| Sensitizing dye III | $3.1 \times 10^{-4}$ |
| EX-2 | 0.335 |
| EX-10 | 0.020 |
| U-1 | 0.07 |
| U-2 | 0.05 |
| U-3 | 0.07 |
| HBS-1 | 0.060 |
| Gelatin | 0.87 |
| Layer 4 2nd Red-sensitive emulsion layer | |
| Emulsion G | 1.0 as Ag |
| Sensitizing dye I | $5.1 \times 10^{-5}$ |
| Sensitizing dye II | $1.4 \times 10^{-5}$ |
| Sensitizing dye III | $2.3 \times 10^{-4}$ |
| EX-2 | 0.400 |
| EX-3 | 0.050 |
| EX-10 | 0.015 |
| U-1 | 0.07 |
| U-2 | 0.05 |
| U-3 | 0.07 |
| Gelatin | 1.30 |
| Layer 5 3rd Red-sensitive emulsion layer | |
| Emulsion D | 1.60 as Ag |
| Sensitizing dye I | $5.4 \times 10^{-5}$ |
| Sensitizing dye II | $1.4 \times 10^{-5}$ |
| Sensitizing dye III | $2.4 \times 10^{-4}$ |
| EX-3 | 0.010 |
| EX-4 | 0.080 |
| EX-2 | 0.097 |
| HBS-1 | 0.22 |
| HBS-2 | 0.10 |
| Gelatin | 1.63 |
| Layer 6 Interlayer | |
| EX-5 | 0.040 |
| HBS-1 | 0.020 |
| Gelatin | 0.80 |
| Layer 7 1st Green-sensitive emulsion layer | |
| Emulsion A | 0.15 as Ag |
| Emulsion B | 0.15 as Ag |
| Sensitizing dye V | $3.0 \times 10^{-5}$ |
| Sensitizing dye VI | $1.0 \times 10^{-4}$ |
| Sensitizing dye VII | $3.8 \times 10^{-4}$ |
| EX-6 | 0.260 |
| EX-1 | 0.021 |
| EX-7 | 0.030 |
| EX-8 | 0.025 |
| HBS-1 | 0.100 |
| HBS-3 | 0.010 |
| Gelatin | 0.63 |
| Layer 8 2nd Green-sensitive emulsion layer | |
| Emulsion C | 0.45 as Ag |
| Sensitizing dye V | $2.1 \times 10^{-5}$ |
| Sensitizing dye VI | $7.0 \times 10^{-5}$ |
| Sensitizing dye VII | $2.6 \times 10^{-4}$ |
| EX-6 | 0.094 |
| EX-8 | 0.018 |
| EX-7 | 0.026 |
| HBS-1 | 0.160 |
| HBS-3 | 0.008 |
| Gelatin | 0.50 |
| Layer 9 3rd Green-sensitive emulsion layer | |
| Emulsion E | 1.2 as Ag |
| Sensitizing dye V | $3.5 \times 10^{-5}$ |
| Sensitizing dye VI | $8.0 \times 10^{-5}$ |
| Sensitizing dye VII | $3.0 \times 10^{-4}$ |
| EX-13 | 0.015 |
| EX-11 | 0.100 |
| EX-1 | 0.025 |
| HBS-1 | 0.25 |
| HBS-2 | 0.10 |
| Gelatin | 1.54 |
| Layer 10 Yellow Filter Layer | |
| Yellow colloid silver | 0.05 as Ag |
| EX-5 | 0.08 |
| HBS-1 | 0.03 |
| Gelatin | 0.95 |
| Layer 11 1st Blue-sensitive emulsion layer | |
| Emulsion A | 0.08 as Ag |
| Emulsion B | 0.07 as Ag |
| Emulsion F | 0.07 as Ag |
| Sensitizing dye VIII | $3.5 \times 10^{-4}$ |
| EX-9 | 0.721 |
| EX-8 | 0.042 |
| HBS-1 | 0.28 |
| Gelatin | 1.10 |
| Layer 12 2nd Blue-sensitive emulsion layer | |
| Emulsion G | 0.45 as Ag |
| Sensitizing dye VIII | $2.1 \times 10^{-4}$ |
| EX-9 | 0.154 |
| EX-10 | 0.007 |
| HBS-1 | 0.05 |
| Gelatin | 0.78 |
| Layer 13 3rd Blue-sensitive emulsion layer | |
| Emulsion H | 0.77 as Ag |
| Sensitizing dye VIII | $2.2 \times 10^{-4}$ |
| EX-9 | 0.20 |
| HBS-1 | 0.07 |
| Gelatin | 0.69 |
| Layer 14 1st Protective layer | |
| Emulsion I | 0.20 as Ag |
| U-4 | 0.11 |
| U-5 | 0.17 |
| HBS-1 | 0.05 |
| Gelatin | 1.00 |
| Layer 15 2nd Protective layer | |
| Polymethyl acrylate particles (diameter: about 1.5 μm) | 0.54 |
| S-1 | 0.20 |
| Gelatin | 1.20 |

Each layer further contained a gelatin hardening agent H-1 and a surface active agent. The total layer thickness was 21 μm.

The emulsions used above are shown in the following table and the compounds used are also shown below.

| | Mean AgI Content (%) | Mean Grain Size (μm) | Variation Coefficient of Grain Size (%) | Diameter/Thickness Ratio (Aspect Ratio) | Silver Amount Ratio (AgI Content %) |
|---|---|---|---|---|---|
| Emulsion A | 4.0 | 0.45 | 27 | 1 | Core/Shell = 1/3 (13/1), Double Structure Grain |
| Emulsion B | 8.9 | 0.70 | 14 | 1 | Core/Shell = 3/7 (25/2), Double Structure Grain |
| Emulsion C | 10 | 0.75 | 30 | 2 | Core/Shell = 1/2 (24/3), Double Structure Grain |
| Emulsion D | 16 | 1.05 | 35 | 2 | Core/Shell = 4/6 (40/0), Double Structure Grain |

-continued
| | | | | | |
|---|---|---|---|---|---|
| Emulsion E | 10 | 1.05 | 35 | 3 | Core/Shell = 1/2 (24/3), Double Structure Grain |
| Emulsion F | 4.0 | 0.25 | 28 | 1 | Core/Shell = 1/3 (13/1), Double Structure Grain |
| Emuslion G | 14.0 | 0.75 | 25 | 2 | Core/Shell = 1/2 (42/0), Double Structure Grain |
| Emulsion H | 14.5 | 1.30 | 25 | 3 | Core/Shell = 37/63 (34/3), Double Structure Grain |
| Emulsion I | 1 | 0.07 | 15 | 1 | Uniform Grain |
EX-1
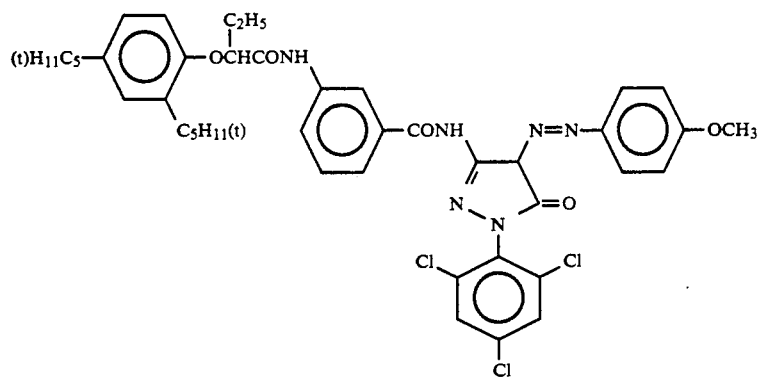
EX-2
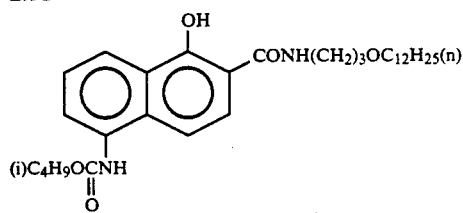
EX-3
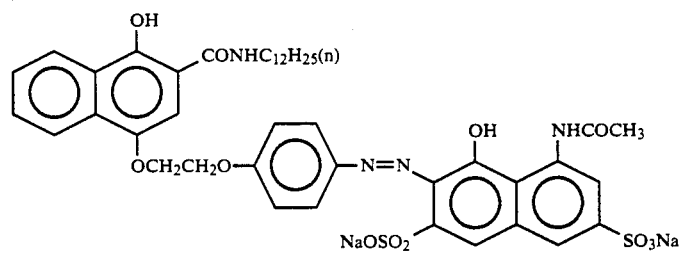
EX-4
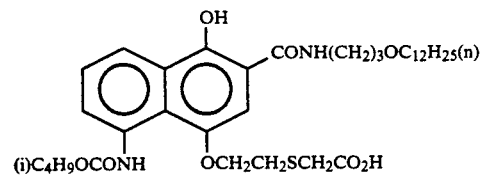
EX-5
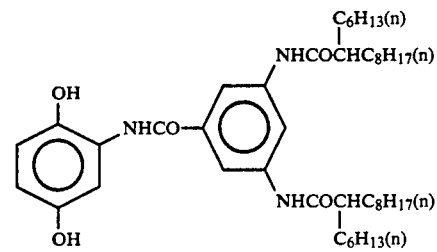
EX-6

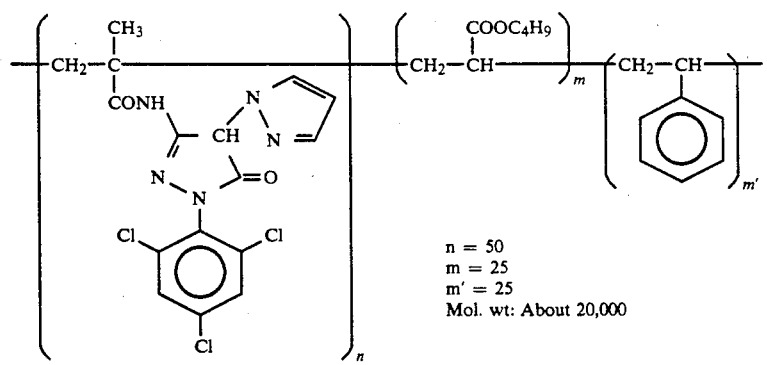
EX-7
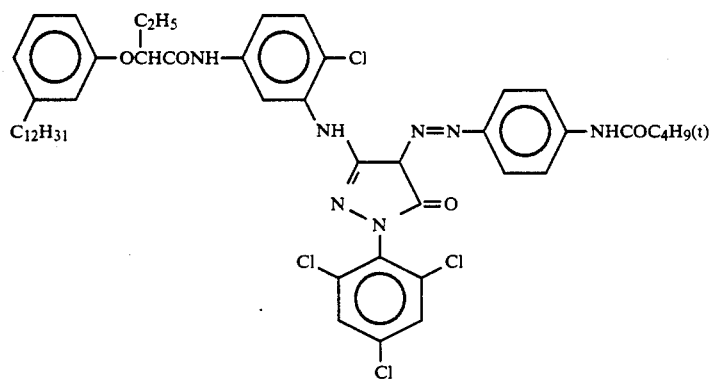
EX-8
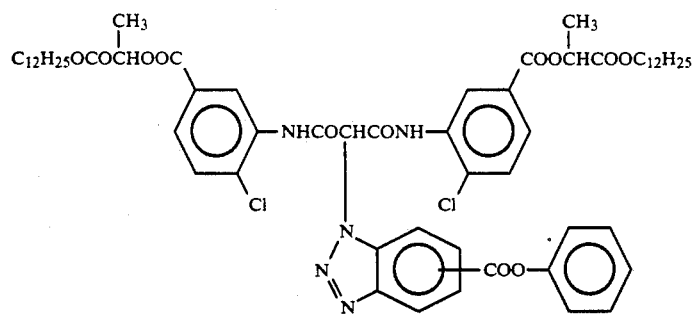
EX-9
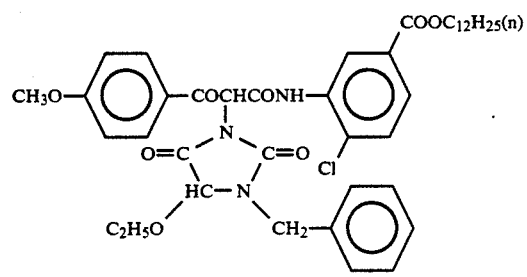
EX-10

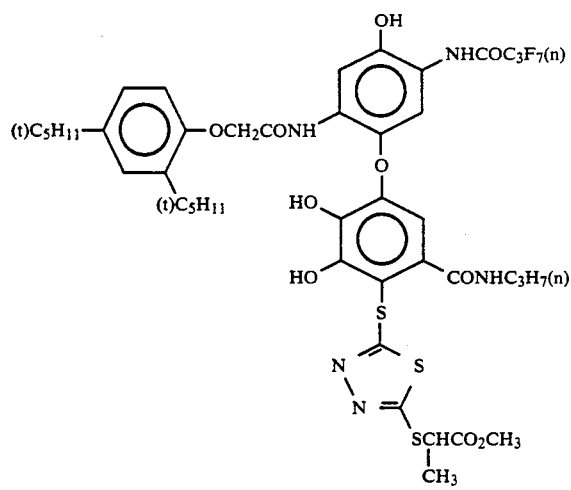
EX-11
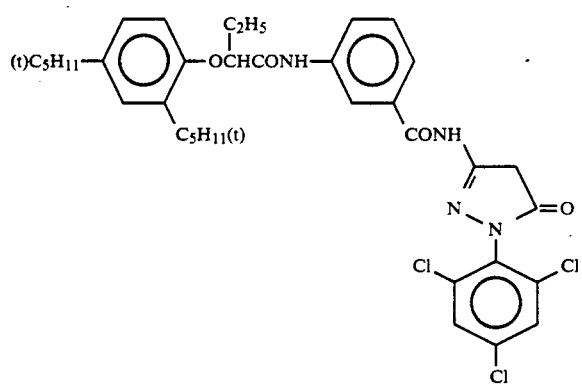
EX-12
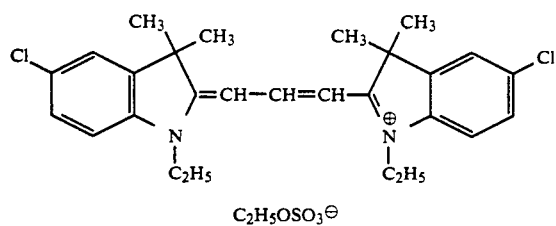
EX-13
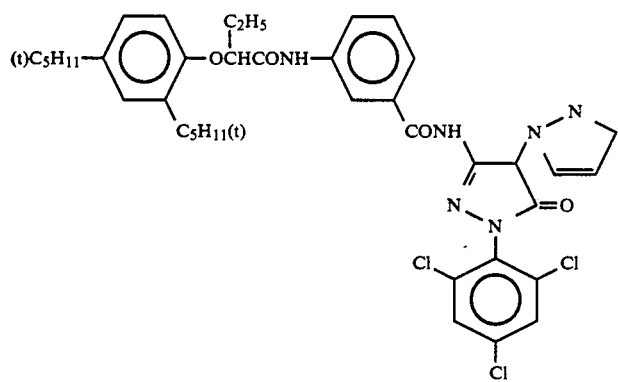
U-1

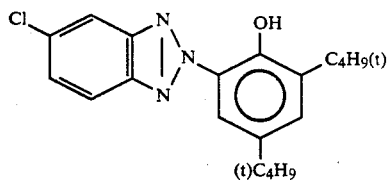
U-2
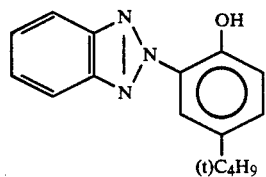
U-3
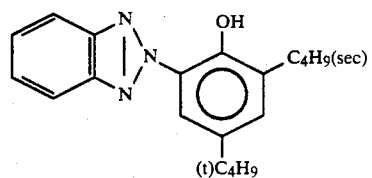
U-4
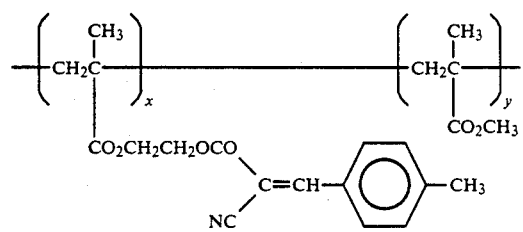
x:y = 70:30 (wt %)
UV-5
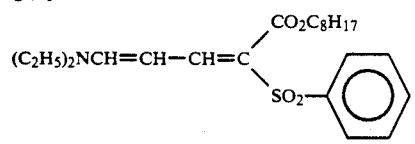
HBS-1 Tricresyl Phosphate
HBS-2 Di-n-butyl Phthalate
HBS-3
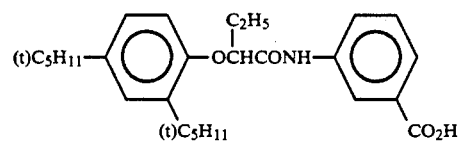
Sensitizing Dye I
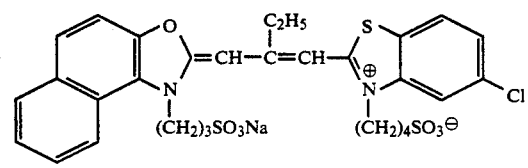
Sensitizing Dye II

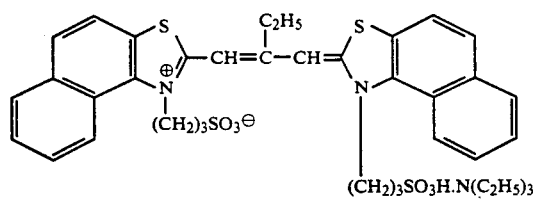
Sensitizing Dye III
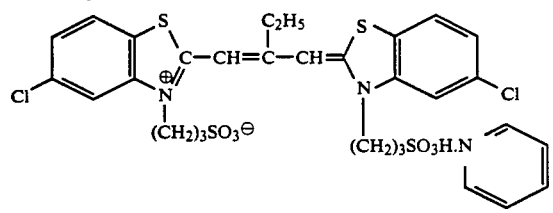
Sensitizing Dye V
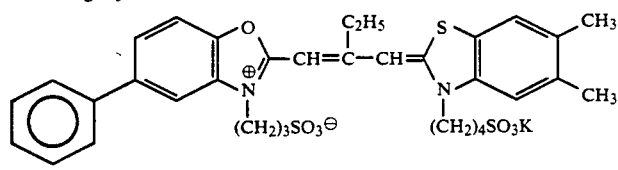
Sensitizing Dye IV
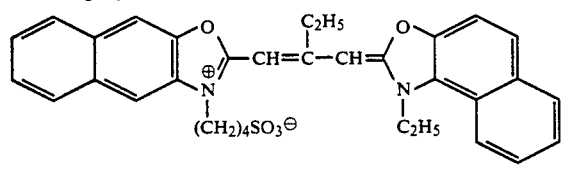
Sensitizing Dye VII
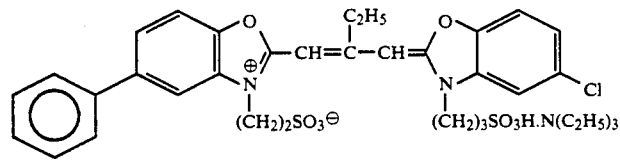
Sensitizing Dye VIII
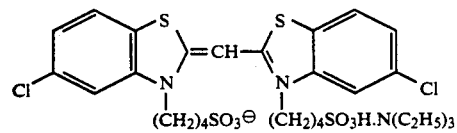
S-1
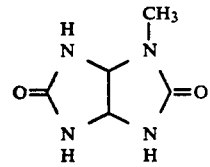
H-1
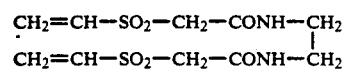
EX-14
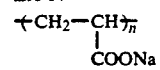

By following the same procedure as the case of preparing the color negative film A except that the coating amount of each back layer (three layers) was equally changed such that the total thickness of the back laye became 8/3 μm, a color negative film B was prepared.

Furthermore, by forming the aforesaid light-sensitive layers on a cellulose triacetate film support having a thickness of 90 μm having a subbing layer on one side, a color negative film C having no back layer was prepared.

TABLE 1

| Color Negative Film | Back Layer Thickness |
|---|---|
| A | 8 μm |
| B | 2.7 μm |
| C | 0 |

2) Preparation of Roll Films

Each of the color negative films A, B, and C was cut into a film of 135 format (35 mm) and wound in the cartridge shown in FIG. 1 or FIG. 5-2 to provide 6 kinds of photographing films.

TABLE 2

| Photographing Film | Color Negative Film | Cartridge |
|---|---|---|
| 101 | A | FIG. 5-2 |
| 102 | B | " |
| 103 | C | " |
| 104 | A | FIG. 1 |
| 105 | B | " |
| 106 | C | " |

Films 101 and 102: Samples of this invention
Films 103 to 106: Comparison samples.

3) Reconstruction of Camera

One non-prewind system camera in which the cartridge loading chamber was reconstructed such that the cartridge shown in FIG. 5-2 could be loaded and one ordinary non-prewind system camera (Fuji Zoom Cardia 800, a trade name, made by Fuji Photo Film Co., Ltd.) were prepared.

4) Photographing

Two frames were photographed in each case and the photograph of the 2nd frame was evaluated. The photographing conditions are shown below.
(I) After finishing the previous photographing, two frames were immediately photographed continuously.
(II) After finishing the previous photographing, one frame was photographed after 24 hours at 25° C., 70% R.H. and the 2nd frame was photographed after 15 minutes at 25° C., 70%. Photographing was conducted in a definite artificial light source set to dark state. A person was photographed at a distance of 3 meters.

5) Development

A negative development was conducted with CN-16 processing.

6) Printing

An ordinary L-size print and an L-size print with trimming such that an effective negative area became ¼ were printed and the sharpness of each image was evaluated. The results are shown in following tables.

TABLE 3

| Photographing Condition | Photographing Material | Sharpness* |
|---|---|---|
| (I) | 101 | 1 |
| " | 102 | 1 |
| " | 103 | 1 |
| " | 104 | 1 |
| " | 105 | 1 |
| " | 106 | 1 |
| (II) | 101 | 1 |
| " | 102 | 2 |
| " | 103 | 5 |
| " | 104 | 3 |
| " | 105 | 4 |
| " | 106 | 6 |

Photographing materials 101 and 102: Invention
Photographing materials 103 to 106: Comparison
*The order of the sharpness was rated by visual evaluation. The smaller the numeral, the higher the sharpness (hereinafter the same).

TABLE 4

| Pseudo Zoom (2 magnifications) Print | | |
|---|---|---|
| Photographing Condition | Photographing Material | Sharpness* |
| (I) | 101 | 1 |
| " | 102 | 1 |
| " | 103 | 1 |
| " | 104 | 1 |
| " | 105 | 1 |
| " | 106 | 1 |
| (II) | 101 | 2 |
| " | 102 | 3 |
| " | 103 | 6 |
| " | 104 | 4 |
| " | 105 | 5 |
| " | 106 | 7 |

Photographing materials 101 and 102: Invention
Photographing materials 103 to 106: Comparison
*The order of the sharpness was rated by visual evaluation.

The difference in sharpness in the photographing condition (II) was clearly observed in the pseudo zoom prints.

The results shown in Table 3 and Table 4 are summarized below.

(1) In the photographing condition (I), the effect of the back layer and the difference by cartridges were not observed.

(2) In the photographing condition (II), the effect of the back layer and the cartridge were observed and it was confirmed that the combination of the back layer and the cartridge of this invention was excellent in sharpness.

(3) It is confirmed that the photographing material having a higher thickness ratio of back layer/light-sensitive layer showed more excellent sharpness. (Photographing condition (II), 101:102, 104:105).

It is rare for usually user to photograph one roll film at one time. Accordingly, the photographing materials 101 and 102 of this invention giving prints having a high sharpness in any time are very useful.

EXAMPLE 2

By following the same procedures as the photographic materials 101 to 106 except that a polyethylene terephthalate film having a mean molecular weight of 40,000 and a thickness of 80 μm was used in place of the cellulose triacetate film, photographing materials 201 to 206 were prepared.

These materials were evaluated in the same manners as in Example 1.

In the case of using the polyethylene terephthalate film support, the sharpness of the prints obtained from the photographing materials 201 and 202 of this invention in the photographing condition (II) was excellent.

EXAMPLE 3

By following the same procedure as Example 2 except that the thickness of the polyethylene terephthalate film support was changed in 90 μm or 120 μm, photographing materials 301 to 304 were prepared.

These photographing materials were used for photographing under the photograph:,ng condition (II) in Example 1 to prepare pseudo zoom prints and the sharpness thereof was evaluated. The results are show below.

TABLE 5

| Photographing Material | Base thickness (μm) | Back Layer | Cartridge | Sharpness* |
|---|---|---|---|---|
| 301 | 90 | used | FIG. 5-2 | 1 |
| 302 | " | none | " | 3 |
| 303 | 120 | used | " | 1 |
| 304 | " | none | " | 2 |

Photographing materials 301 and 303: Invention
Photographing materials 302 and 304: Comparison
*The order of the sharpness was rated by visual evaluation.

Thus, it has been confirmed that the effect of this invention is more remarkable as the thickness of the base is thinner.

The result shows that by the combination of the back layer and the cartridge of this invention, even in the case of performing a pseudo zoom printing, the thickness of the base can be reduced and the cartridge can be small-sized, which shows the excellent significance of the present invention.

EXAMPLE 4

By following the same procedure as Example 1 except that a modified polyethylene terephthalate film (mol ratio of ethylene glycol: terephathlic acid: adipic acid: lithium sulfonated isophthalic acid = 1:1:0.08:0.06) having an average molecular weight of 10,000 or a polycarbonate film having an average molecular weight of 40,000 was used in place of the polyethylene terephthalate film, substantially the same results as those of Example 1 were obtained.

According to this invention, a photographic film package giving prints having excellent sharpness can be obtained. Such a photographic film package is particularly suitable for a pseudo zoom printing system.

While the invention has been described in detail and with reference to specific embodiments thereof, it will be apparent to one skilled in the art that various changes and modifications can be made therein without departing from the spirit and scope thereof.

What is claimed is:

1. A photographic film package comprising a spool having wound around it a multilayer silver halide color photographic film comprising a red-sensitive silver halide emulsion layer, a green-sensitive silver halide emulsion layer and a blue-sensitive silver halide emulsion layer; and a cartridge rotatably containing the spool carrying the photographic film, said cartridge having a film outlet for taking out and in the photographic film wherein said cartridge has a means for controlling the position thereof when the photographic film package is loaded in a camera such that the aforesaid film outlet is kept in the plane including the exposure stage in the camera and the direction of taking out or in the photographic film in the camera becomes parallel to the winding direction of the photographic film in the camera, and the photographic film has light-sensitive layers having a total layer thickness of not thicker than 30 μm on one side of a transparent support and a back layer containing a hydrophilic polymer having a layer thickness of from 15% to 90% of the total layer thickness of the light-sensitive layers on the other side of the support.

2. The photographic film package of claim 1, wherein a dimensional precision of an external shape of said cartridge is less than ±0.5 mm.

3. The photographic film package of claim 1, wherein said light-sensitive layers have a total layer thickness of from 12 to 21 μm.

4. The photographic film package of claim 1, wherein said back layer has a layer thickness of from 20 to 70% of the total layer thickness of the light-sensitive layers.

5. The photographic film package of claim 1, wherein said hydrophilic polymer in the back layer is gelatin.

6. The photographic film package of claim 1, wherein said back layer comprises a high-boiling organic solvent and gelatin at a weight ratio of the high-boiling organic solvent to gelatin of from 0.1 to 7.

7. A photographic film package for insertion within a cartridge chamber of a camera, said package being of the type having a cartridge, a multilayer silver halide color photographic film comprising a red-sensitive silver halide emulsion layer, a green-sensitive silver halide emulsion layer and a blue-sensitive silver halide emulsion layer and wound on a spool within said cartridge, and a film port for drawing said film out of said cartridge and for retracting said film into said cartridge, and further comprising:

positioning means on said cartridge for cooperating with positioning means in said cartridge chamber for fixedly orienting said package within said chamber when said package is placed within said chamber to insure that said film exiting through said port towards an exposure position within said camera exits parallel to the winding direction of said camera so as to exhibit flatness at said exposure position;

wherein said positioning means comprises at least one projection on the outside of said package to mate with a corresponding depresion on an inside wall of said cartridge chamber so as to prevent rotation of said package within said chamber;

further wherein said package has two end walls and said at least one projection is on an end wall of said package.

8. The photographic film package of claim 7 wherein said positioning means comprises at least two flat surfaces on the outer surface of said package to mate with corresponding flat surfaces on the inner walls of said cartridge chamber so as to prevent rotation of said package within said chamber.

9. The photographic film package as claimed in claim 7 wherein the improvement further comprises, said film having light-sensitive layers with a total layer thickness of not greater than 30 μm on one side of a transparent support and a back layer containing a hydrophilic polymer having a layer thickness of from 15% to 90% of the total layer thickness of the light-sensitive layes on the other side of the support.

10. The photographic film package of claim 7, wherein said cartridge is made of a resin.

* * * * *